United States Patent
Gillis et al.

(10) Patent No.: US 7,094,129 B2
(45) Date of Patent: Aug. 22, 2006

(54) MAGNETIC RECORDING HEAD BURNISHING METHOD

(75) Inventors: Donald Ray Gillis, San Jose, CA (US); Kris Victor Schouterden, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/065,319

(22) Filed: Feb. 23, 2005

(65) Prior Publication Data
US 2005/0197047 A1 Sep. 8, 2005

Related U.S. Application Data

(62) Division of application No. 09/731,953, filed on Dec. 6, 2000, now abandoned.

(51) Int. Cl.
*B24B 39/00* (2006.01)
(52) U.S. Cl. .................. 451/8; 451/41; 29/603.03; 29/90.01
(58) Field of Classification Search .............. 451/5, 451/8, 9, 10, 11, 41, 42, 63; 29/603.03, 90.1
See application file for complete search history.

(56) References Cited

U.S. PATENT DOCUMENTS

| | | | | |
|---|---|---|---|---|
| 5,488,524 A | * | 1/1996 | Cunningham | 360/236.8 |
| 6,178,068 B1 | * | 1/2001 | Sugimoto | 360/236.5 |
| 6,493,184 B1 | * | 12/2002 | Smith | 360/135 |
| 6,707,631 B1 | * | 3/2004 | Haddock | 360/75 |
| 2002/0197936 A1 | * | 12/2002 | Smith | 451/41 |

* cited by examiner

*Primary Examiner*—Jacob K. Ackun, Jr.
(74) *Attorney, Agent, or Firm*—Bracewell & Giuliani LLP

(57) ABSTRACT

A slider burnishing method is introduced, in which the slider is brought into a predetermined surface contact with the rotating disk for a specified period. The predetermined surface contact end the specified time period are selected together with the surface condition of the rotating hard disk, such that smoothened slider surface is abrasively formed. The smoothened slider surface is substantially parallel to the disk surface and thus provides reduced contact pressure during eventual operational contacting. In addition, the smoothened slider surface creates a constant gap together with the disk surface, which enhances the aerodynamic properties of the air bearing surface and stabilizes a small fly height.

16 Claims, 6 Drawing Sheets

MAGNETIC RECORDING HEAD BURNISHING METHOD

REFERENCE TO RELATED APPLICATION

This is a divisional of application Ser. No. 09/731,953 filed Dec. 6, 2000 now abandoned.

BACKGROUND OF INVENTION

The continuous development of magnetic recording disk drives results in ever increasing data storage densities in the storing layers. To read and write the magnetic signals, the read and write heads have to be kept in ever-closer distance to the rotating disc surface where the storing layers are deposited.

The read and write heads are typically integrated in the so-called sliders, which provide specifically designed three-dimensional features on their bottom side that is next to the disk surface. These three-dimensional features utilize the viscosity and kinetic energy of a rotating air stream induced by the spinning disk to lift the sliders on a predetermined fly height during the hard disk operation.

The viscosity of the air stream depends mainly on the air temperature and the air pressure. The kinetic energy of the rotating air stream depends on its velocity relative to the slider and subsequently on the rotational speed of the hard disk.

The bottom side performs the function of an air bearing in closest proximity to the disk surface. As a result fly heights in the nanometer range can be implemented.

Such small fly heights require high precision of the disk surface since even the smallest surface inconsistencies result in a contacting of the slider with the fast moving disk surface. Even though the utilized fabrication processes provide for sufficient surface evenness of the hard disk, special wear-in procedures are commonly performed to eliminate eventual and/or recognized surface unevenness. These wear-in procedures are typically performed by reducing the fly height below the operational level and moving the slider over the surface until no contacting is recognized anymore. The slider, which is made of a relatively hard material is thereby utilized as an abrasive tool to remove any interfering surface inconsistencies from the relatively soft top layers of the hard disk.

The fly height is typically reduced by changing the rotational speed of the hard disk and/or by changing the air pressure.

A number of U.S. Patents discloses variations of the hard disk wear-in procedure, which is commonly referred to as burnishing.

U.S. Pat. No. 5,696,643 and U.S. Pat. No. 5,863,237, for instance, describe methods to burnish away topographic irregularities from the disk surface. After recognizing an surface irregularity via a thermal contacting signal, the rotational speed of the hard disk is reduced and the fly height of the read/write head is lowered. The burnishing is performed over a certain time period, during which the height of the surface irregularities is continuously reduced. After finishing the disk burnishing the interference signals no longer occur during operational rotation of the hard disk.

Japanese Patent JP 06309636 describes a similar burnishing method, except that the read/write head is lowered by reducing the air pressure under which the hard disk drive operates.

The thermal contacting signal results from a dynamic resistance change in the read head, which is thermally induced by the frictional energy created during the contacting of the head.

The dynamic resistance change itself may be recognized with various methods. In one method, it is recognized during the regular read operation of the hard disk. This requires a fully functioning hard disk drive, including a partitioned hard disk. U.S. Pat. No. 5,751,510 describes such a method.

In another method, the dynamic resistance change is obtained by the read/write head without reading any data from the hard disk. In such a case, an electrical stimulus voltage is applied to the read head. This method can be performed at an earlier hard disk fabrication stage since it does not require operational data read from the hard disk surface. A calibration signal and/or a calibration value has to be obtained for a known non-interference condition. U.S. Pat. No. 5,806,978, for instance, describes such a method.

With continuously decreasing fly heights a contacting and non-contacting operational conditions in the head/disk interface become less and distinctly able. Read/write heads operate typically with their air bearing surface in, an angulated orientation relative to the disk surface. The microscopic air bearing features are typically fabricated with a common protrusion direction normal to the substrate plane, which results in essentially coplanar surfaces and linear edges. The design of the air bearing surface defines the primary contacting edge, which initially contacts the moving disk surface. In the case where the front portion of the air bearing surface is raised sufficiently, the primary contacting edge becomes the front edge with the read and write elements. In such a case, the contacting of the slider during the regular hard disk operation occurs mainly with the slider front edge.

The linear contacting of the slider with the primary contacting edge results in relatively high surface pressures, which result in wear of the disk surface and/or the slider. As a result of disk wear, debris may adhesively build up on the primary contacting edge. Since it is desirable to have the read/write heads in closest proximity to the disk surface, they are preferably in an area adjacent to the primary contacting edge. Debris built-up alters the read and write characteristic of the heads and needs to be prevented. U.S. Pat. No. 6,088,199, for instance, discloses an abrasive section placed on the hard disk to remove eventual debris built-up on the slider. The patent does not prevent debris from building up, however. It provides only a cleaning method.

Wear in the head/disk interface related to operational slider contact is explored in a number of scientific disclosures.

In IEEE Trans. Magn. (USA) vol 34, no. 4, pt. 1, p. 1714–16, a conference/journal paper is disclosed, which describes the abrasive wear and adhesion of the slider surface.

In the 1996 AME/STLE Tribology Conference (TRIB-Vol. 6) p. 17–23, a conference paper is disclosed, which describes new techniques for evaluating slider wear and burnishing of the head/disk interface.

Further, in the Proceedings of the SPIE—The International Society of Optical Engineering (USA) vol. 2604 p. 236–43, contact force measurements at the head/disk interface for contact recording heads in magnetic recording are disclosed and correlated to the burnishing in the head/disk interface.

Finally, in the Journal of Materials Research vol. 8, no. 7 p. 1611–28, friction and wear studies of silicon in sliding contact with thin-film magnetic rigid disks are disclosed.

The ever decreasing fly heights make the limitations described in the above scientific paper increasingly stringent.

The present invention addresses these limitations and provides a solution for them.

OBJECTS AND ADVANTAGES

It is a primary slider head in for creating the object of the present invention to provide a wear reducing configuration and a method same.

It is another object of the present invention to provide a method for creating the wear-reducing configuration with feasible fabrication effort.

SUMMARY

A slider burnishing method is introduced, in which a primary contacting area of the slider is flattened in an abrasive way.

The primary contacting area is defined by the operational orientation of the slider relative to the hard disk surface. In the case of a planar slider, the contacting area is essentially a contacting edge at the front end of the slider where the read and write heads are located.

There are techniques known to those skilled in the art that apply a bending in the form of a crown and/or camber to the air bearing surface. The bending of the air bearing surface results in a smoother contacting of the air bearing surface with the hard disk surface. In such a case the contacting area may be at a more central location of the slider adjacent to the location of the read and write heads.

The abrasive flattening of the contacting area is accomplished by applying a slider burnishing method during which the slider is kept in contact with the rotating hard disk. The slider burnishing method is designed for:

preventing damage of the relatively soft surface layers of the hard disk;
preventing debris accumulation in the contacting area during the slider burnishing;
keeping the thermal rise in the slider below a critical maximum; and
creating a predetermined flattened area.

The slider burnishing creates a flattened area that is planar and essentially parallel to the hard disk surface. An eventual contacting of the slider with the hard disk surface results in reduced surface pressure in the contacting area, which is commonly referred to as the head/disk interface. The slider contacting may either be intermediate or permanent.

Under operational conditions where a fly height needs to be maintained, the flattened area defines, together with the hard disk surface, an even air bearing gap. This air bearing gap enhances the aerodynamic properties of the air bearing surface, such that smaller fly heights can be utilized in a stable fashion.

The slider burnishing method consists of a number of individual steps with various contacting forces and rotational disk speeds. The main steps perform the following tasks:

preparing the hard disk surface by removing eventual topographic inconsistencies;
burnishing the slider; and
checking the burnishing result.

In an alternate embodiment the slider burnishing process is mainly performed by the following steps:

deriving a resistive reference signal during a non-contacting condition of the slider.
preparing the hard disk surface by removing eventual topographic inconsistencies;
burnishing the slider;
checking the burnishing result; and
sweeping the disk surface to remove debris.

The calibration signal is derived prior to the slider burnishing, to have a reference value so as to determine the contacting signal. Calibration signal and contacting signal are a function of the read head resistance, which influences a bias voltage applied to the read head during the slider burnishing. The read head resistance is dependent on the read head temperature and changes during frictional contact with the disk surface, as is known to those skilled in the art.

The contacting signal is utilized to observe the contacting characteristic during the following steps of the slider burnishing method.

During the disk surface preparation the fly height is consecutively lowered in correspondence with a reduction of the rotational disk speed. Topographic inconsistencies are thereby removed without creating abrasive deposits on the contacting area.

The slider burnishing is the most time consuming step of the slider burnishing method and is performed with a predetermined contacting force at a relatively low rotational speed. Since the disk surface has been smoothened sufficiently a permanent slider contact can be maintained without the risk of vibrations and/or excessive abrasion induced by eventual topographic inconsistencies. During the slider burnishing, the slider is continuously moved over the rotating disk surface to prevent local thermal rise in the disk surface. Rotational speed and contacting force are also selected to keep thermal rise of the slider below a critical level at which the heat sensitive components of the slider may be damaged and/or debris may weld on the contacting area.

During the clearance check the fly height is raised to a level at which no contacting signal is recognized anymore.

The final sweeping step removes any debris accumulated on the disk surface during the prior burnishing operation.

The slider burnishing method is performed with various rotational speeds and independently defined fly heights and/or contact forces between the slider and the hard disk surface. To adjust the fly heights and/or the contact forces in an independent fashion to the rotational speeds, the air pressure under which the slider burnishing is performed is correspondingly adjusted.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
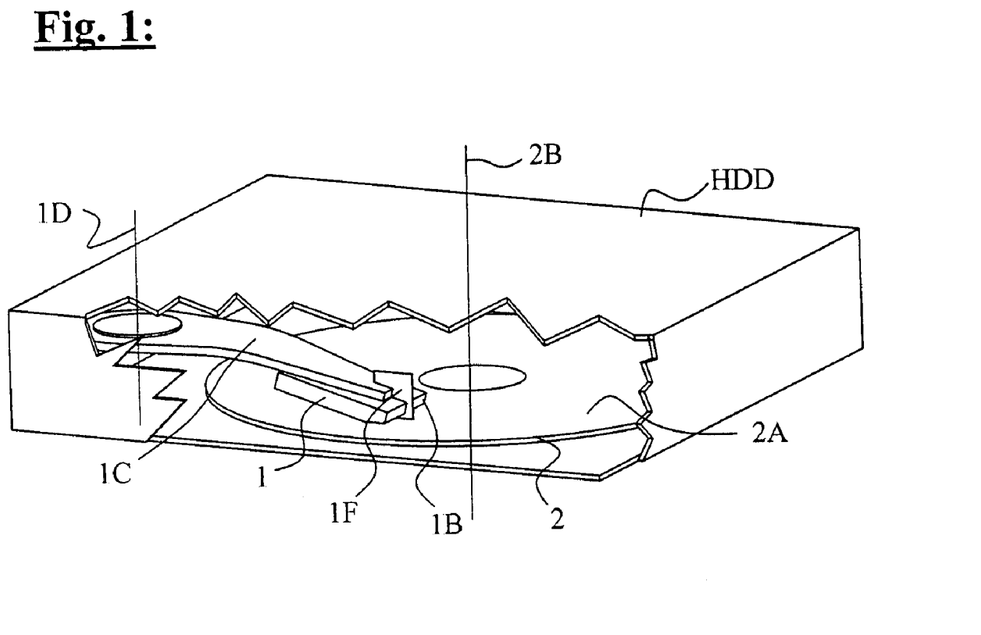
FIG. 1 shows a three-dimensional view of a simplified hard disk drive with a removed housing portion such that a hard disk and a slider attached on a slider arm are visible.

FIG. 1 shows the a simplified hard disk drive HDD with the main operational components involved in the slider burnishing being visible through a removed housing portion of the hard disk drive HDD. A slider 1 is attached to a slider arm 1C, which pivots around a slider arm axis 1D. The slider has a front face 1B and a symmetric plane 1F. FIG. 1 also shows a hard disk 2 having a hard disk surface 2A and a spinning axis 2B.

During the slider burnishing, the slider arm 1C pivots around the slider arm axis 1D such that the slider 1 performs centripetal and centrifugal movements along the hard disk surface 2A of the spinning hard disk 2. Dependent on the velocity of the centripetal and centrifugal slider movements relative to the rotational speed of the hard disk surface, the symmetric plane 1F defines a movement angle together with the resulting movement vector in the interface between the slider 1 and the hard disk surface 2A. In the case where the slider arm 1C does not move, the movement angle is approximately zero.

It is clear to one skilled in the art how the geometric and dynamic conditions of the hard disk 2 and the slider arm 1C precisely define the movement angle.

Figure 2:
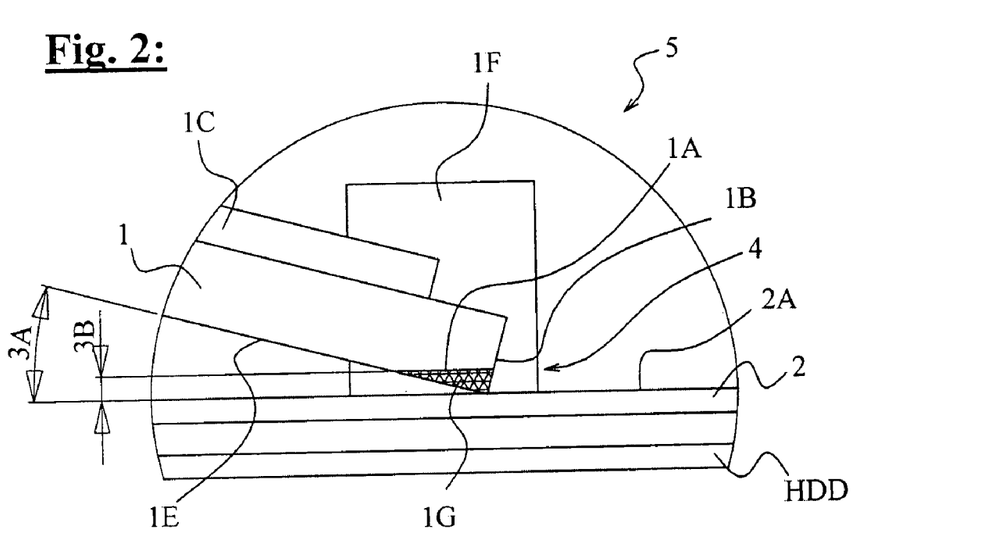
FIG. 2 shows an enlarged detailed view of the interface between the slider and the hard disk of FIG. 1 in a direction perpendicular to a reference plane also shown in FIG. 1.

FIG. 2 shows an enlarged view of the, interface between the slider 1 and the hard disk 2 in a direction perpendicular to the reference plane 1F. The main physical characterizing elements of the present invention in the slider/disk interface are:
the hard disk surface 2A;
adaptation surfaces 1E, 11E, 12E, 13A (see FIGS. 3–6);
front faces 1B, 11B, 12B, 13B (see FIGS. 3–6);
burnishing areas 1A, 11A, 12A, 13A (see FIGS. 3–6); and
burnishing sensors 1R, 11R, 12R, 13R (see FIGS. 3–6).

The front faces 1B, 11–13B are shown in planar configuration for the purposes of general understanding. It is noted that front faces of sliders may have any shape without affecting the core of the invention.

For general understanding, the introductory example described in FIG. 2 refers to the slider 1 having a planar adaptation surface 1E perpendicular to the symmetric plane 1F. The adaptation surface 1E is oriented with an adaptation angle 3A relative to the hard disk surface. In the preferred embodiment of the invention, the adaptation angle 3A is essentially identical with an operational angle (not shown) under which the adaptation surface 1E will be kept in position during the operational use of the hard disk drive.

The core of the invention also applies to a case where the adaptation angle 3A is different from the operational angle.

During the slider burnishing a contacting condition is provided between the adaptation surface 1E and the hard disk surface 2A, which results in a burnishing area 1A abrasively formed by the hard disk surface 2A. In the preferred embodiment the contacting condition is provided by altering dynamic and/or static fluid properties that influence a fly height of the slider 1 above the hard disk surface 2A, as is known to those skilled in the art. The dynamic fluid properties are, for instance, altered by changing the rotational speed of the hard disk 2, such that the velocity of a concentrically circulating fluid stream is reduced.

The static fluid properties are, for instance, altered by changing the fluid viscosity, for instance, by reducing the static pressure of a compressible fluid.

The fluid utilized for the slider burnishing may be identical to/or different from the operational fluid under which the hard disk drive is operated. In the preferred embodiment the burnishing fluid is air.

It is noted that the burnishing fluid may be any gaseous or liquid material that is suitable for providing the contacting characteristic. The preferred gaseous burnishing fluid is air. Alternate gaseous burnishing fluids may be, for instance He, or Ne, which may introduce a reduced fly height due to their low viscosity relative to the viscosity of the operational fluid in the preferred form of air. In general, the fly height may be adjusted during the burnishing process by altering the composition of the burnishing fluid and consequently the viscosity relative to the composition of the operating fluid. The operating fluid is the fluid, which fills the space between the slider and the disk surface during the operational use of the hard disk. In addition, the inert nature of He and Ne protect the slider and disk surface against oxidation, which may result from the elevated temperatures in the burnishing interface between slider and disk surface.

In addition, any burnishing enhancing material may be applied to the hard disk surface 2A and/or the adaptation surface 1E, 11–13E to enhance the slider burnishing process. In particular, slider burnishing enhancing materials that overcome the limitations imposed by the operational softness of the hard disk surface 2A relative to the operational hardness of the adaptation surface 1E may be applied to the hard disk surface 2A prior to the slider burnishing process. This burnishing enhancing material may be applied in a fashion that corresponds to the burnishing process such that at the end of the burnishing process the burnishing enhancing material itself is abraded and no longer present on the hard disk surface 2A.

During the slider burnishing process, material is removed from the slider 1. The removed material 1G leaves a burnished area 1A behind. The removal material height 3B defines, together with slider shape, the removed material volume. The removed material volume influences the slider burnishing time. To keep the slider burnishing time to a minimum the contacting characteristic has preferably a contact force gradient that corresponds to the increase of burnishing area during the slider burnishing. As a result, the contact pressure in the slider/disk interface remains constant and below a critical level. The critical pressure level is defined by the abrasion resistance of the hard disk surface 2A and the thermal drain capacity of the slider.

The adaptation angle 3A influences a fly characteristic of the slider 1 above the hard disk surface 2A. The fly characteristic keeps the slider 1 in a predetermined fly height range under operational conditions as is known to those skilled in the art. The burnished areas 1A, 11–13A define, together with the hard disk surface 2A, an operational gap that has stabilizing influence on the fly characteristic. In the preferred embodiment where the adaptation angle 3A is essentially equal to the operational angle the operational gap has a consistent width. As a result, the fluid stream in the gap has a constant velocity resulting in a balanced fluid pressure in the gap. In case of a contacting of the slider 1 with the hard disk surface 2A, the burnished areas 1A, 11–13A contact snuggly with the hard disk surface 2A, which avoids unfavorable abrasion of the hard disk surface 2A.

In FIGS. 3–6 a number of configurations of the sliders 1, 11–13 is shown. The configurations of the sliders 1, 11–13 are shown with the adaptation surfaces 1E, 11–13E, the contacting sensors in the preferred form of data read heads 1R, 11–13R, write heads 1W, 11–13W, the burnished areas 1A, 11–13A and the front faces 1B, 11–13B.

Figure 3:
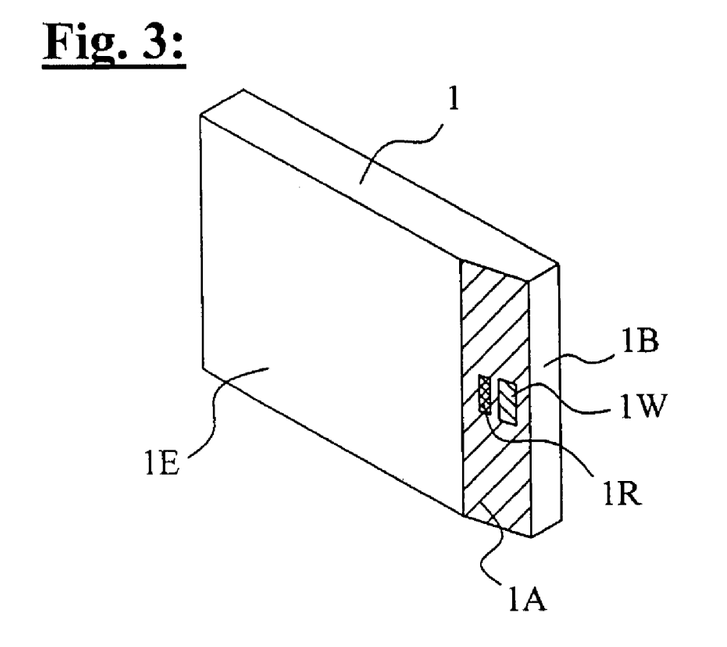
FIG. 3 shows a simplified slider with an essentially planar adaptation surface.
Figure 4:
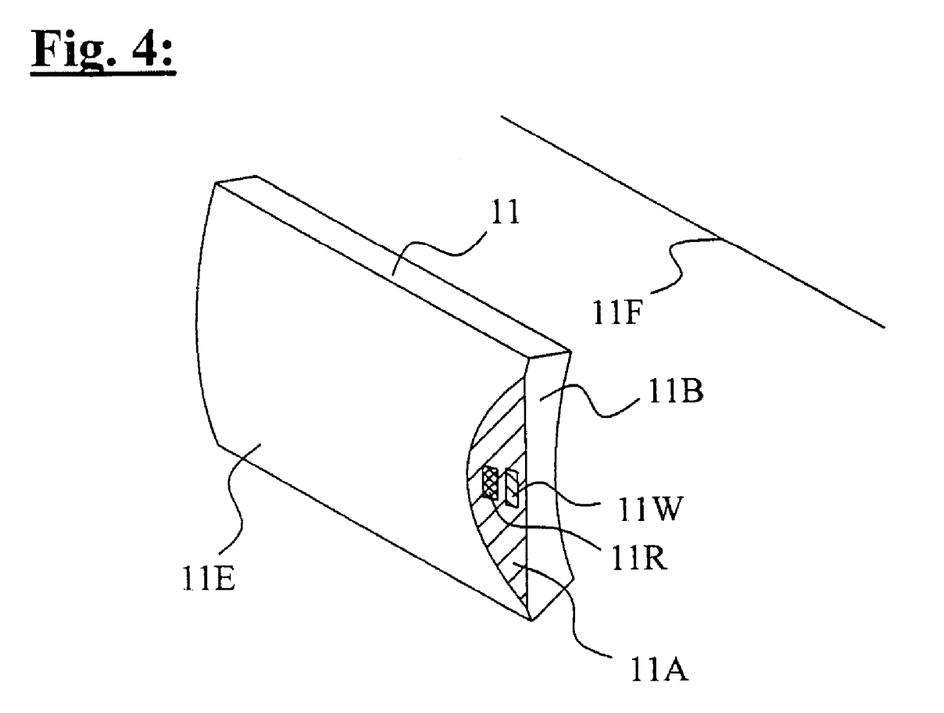
FIG. 4 shows a simplified slider with a first curved adaptation surface having a curvature axis that is collinear with a symmetric plane of the slider.

The sliders 1, 11 of FIGS. 3 and 4 have their data read heads 1R and 11R within the burnished area 1A, 11A.

Figure 5:
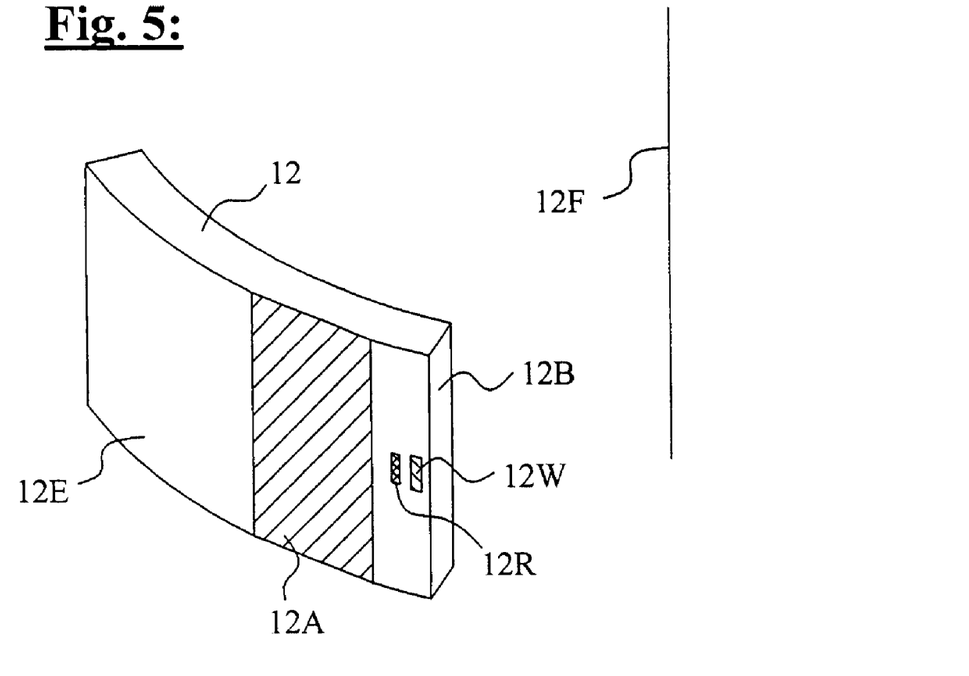
FIG. 5 shows a simplified slider with a second curved adaptation surface having a curvature axis that is perpendicular to a symmetric plane of the slider.
Figure 6:
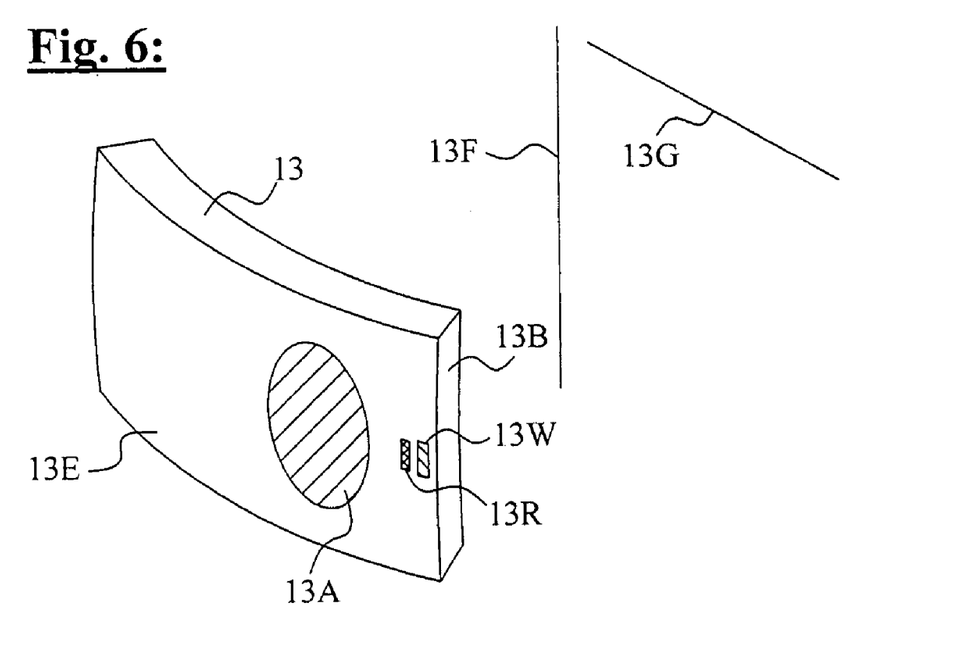
FIG. 6 shows a simplified slider with a third curved adaptation surface having the first and second curvature axes.

The sliders 12, 13 of FIGS. 5 and 6 have their data read heads 12R and 13R outside the burnished area 12A, 13A.

In FIG. 4, the adaptation surface 11E has a curvature with a curvature axis 11F. The curvature of the adaptation surface 11E is known to those skilled in the art as camber.

In FIG. 5, the adaptation surface 12E has a curvature with curvature axis 12F. The curvature of the adaptation surface 12E is known to those skilled in the art as crown.

In FIG. 6, the adaptation surface 13E has a curvature with a curvature axes 13F and 13G. The curvature of the adaptation surface 13E is a combination of crown and camber.

For the exemplary sliders 1, 11 the adaptation angle 3A remains constant during the slider burnishing process. For the exemplary sliders 12, 13 the adaptation angle 3A increases during the slider burnishing process.

At the start of the slider burnishing the sliders 1, 11–13 have initial burnishing contacts with the hard disk surface 2A. At the initial burnishing contacts the burnishing areas 1A, 11–13A start to form and to expand. For the slider 1, the initial burnishing contact is an edge of the front face 1B and the adaptation surface 1E. For the slider 11, the initial burnishing contact is a point on the edge of the front face 2B and the adaptation surface 2E.

For the slider 12, the initial burnishing contact is a initial contacting line parallel to the curvature axis 12F.

The distance of the initial contacting line to the data read head 12R depends on the overall orientation of the slider 12 to the hard disk surface 2A.

For the slider 13, the initial burnishing contact is an initial contacting point. The distance of the initial contacting point to the data read head 13R depends on the overall orientation of the slider 13 to the hard disk surface 2A.

The burnishing areas 1A, 12A have a first extension direction essentially perpendicular to the front faces 1B and 11B.

Since the sliders 1, 11–13 are shown with final fabricated burnishing areas 1A, 11–13A, the initial burnishing contacts are no longer present and therefore not shown.

During the slider burnishing of the slider 1, the burnishing area 1A expands away form the edge between the front face 1B and the adaptation surface 1E. As shown for the slider 1, the burnishing area 1A expands beyond the data read head 1R and the write head 11W.

During the slider burnishing of the slider 11, the burnishing area 11A expands away form the initial contacting point on the edge between the front face 2B and the adaptation surface 2E. As shown for the slider 11, the burnishing area 11A expands beyond the data read head 11R and the write head 11W.

During the slider burnishing of the slider 12, the burnishing area 12A expands away form the initial contacting line. As shown for the slider 12, the initial contacting line is at a distance to the data read head 12R, such that the final expanded burnishing area 12A does not overlap with the data read head 12R and the write head 12W.

During the slider burnishing of the slider 13, the burnishing area 13A expands away form the initial contacting point. As shown for the slider 13, the initial contacting point is in a distance to the data read head 13R such that the final expanded burnishing area 13A does not overlap with the data read head 13R and the write head 13W. It is clear to one skilled in the art that the configurations of the sliders 1, 11–13 may be defined such that the burnishing areas 1A, 11–13A may or may not overlap with the data read heads 1R, 11–13R.

It is clear to one skilled in the art that the adaptation surfaces 1E, 11–13E may have any shape or configuration. Furthermore, the adaptation surfaces 1E, 11–13E may form an air bearing surface at is known to those skilled in the art, and/or may be a component of an air bearing surface.

The slider burnishing process is monitored by use of a contacting sensor. In the preferred embodiment the contacting sensors are the data read heads 1R, 11–13R as they are known to those skilled in the art for the recognition of disk surface contact recognition. In the preferred embodiment the natural resistance of the data read heads 1R, 11–13R is recognized prior to the slider burnishing process and utilized as a reference value. During the slider burnishing a dynamic and static resistance changes may occur in the data read heads 1R, 11–13R.

A dynamic resistance change is mainly induced by a thermal friction energy resulting from a disk surface contacting of the contacting sensors and/or surrounding areas of the sliders 1, 11–13.

A static resistance change is mainly induced in a case where the contacting sensors are or become part of the burnishing area during the slider burnishing as it is shown with the sliders 1, 11. The removing of material 1G includes a removing of the contacting sensor material, which results in a static resistance change of the contacting sensor.

Figure 7:
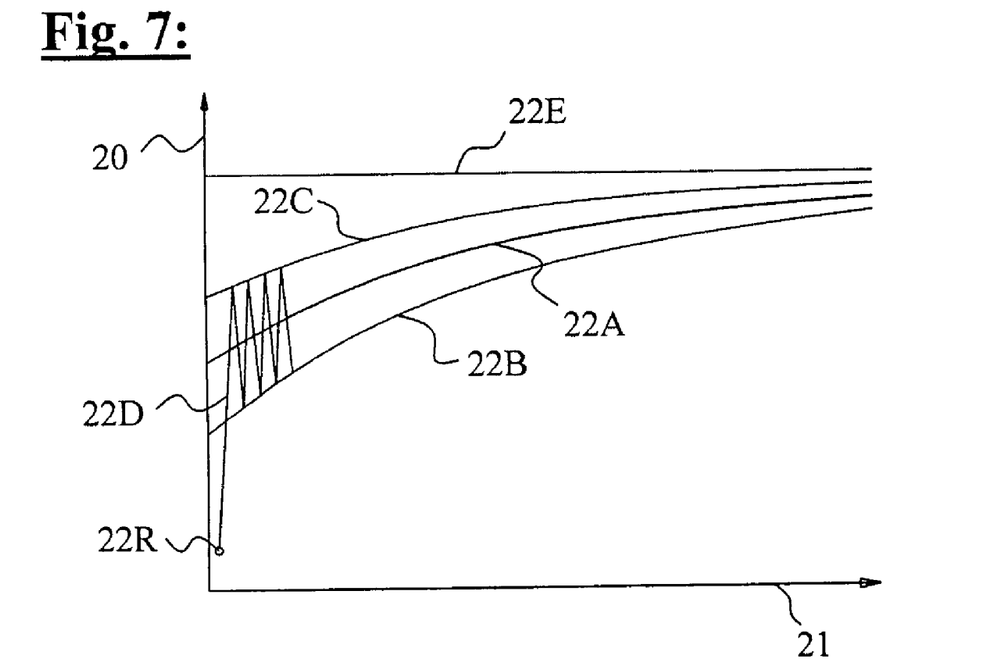
FIG. 7 shows a simplified graph of a control signal change during the slider burnishing process for an exemplary case where the control signal sensor is within the burnishing area.

In FIG. 7 a simplified graph shows a curve 22A representing the static resistance change and a curve 22D representing the dynamic resistance change for a case where the data read heads 1R, 11–13R are overlapped by the burnishing areas 1A, 11–13A.

The vertical axis 20 (see also FIG. 8) represents the resistance change relative to the total read head resistance. The horizontal axis 21, 31, 41 (see FIGS. 8, 11, 12) represent a number of burnishing cycles during which the sliders 1, 11–13 are moved back and forth on the disk surface 2A.

Prior to the slider burnishing, a reference value 22R, 23R, 32R and 42R (see also FIGS. 8, 11, 12) is recognized preferably on a slider position for which a non-contacting condition is secured. Such a slider referencing position is preferably on a parking ramp where the slider arm 1C is parked during non-operation of the hard disk drive.

The curve 22A has an initial incline angle and becomes flatter during the slider burnishing. The curve 22A approaches asymptotically to a theoretical maximum line 22E. The incline angle of the curve 22A over its length corresponds to the increasing removed material height 3B. The burnishing areas 1A, 11–13A start to form from a contacting line or a contacting point, such that a relatively low amount of initially removed material 1G results in a relatively high gain of removed material height 3B.

With continuing material removal the burnishing areas 1A, 11–13A extend. As a result, for a given amount of removed material the gain of removed material height 3B becomes ever smaller. The increase of the burnishing areas 1A, 11–13A also results in a reduced contacting pressure for a given contacting force. Since the contacting force is limited to prevent thermally induced damages to the disk surface 2A and/or the sliders 1, 11–13, the contacting pressure reaches a level at which abrasion of the slider material no longer occurs. The material properties of the sliders 1, 11–13, the abrasive properties of the hard disk surface 2A and the maximum contacting force define a theoretical maximal burnishing area extension, which is recognized by the theoretical maximum line 22E.

Figure 8:
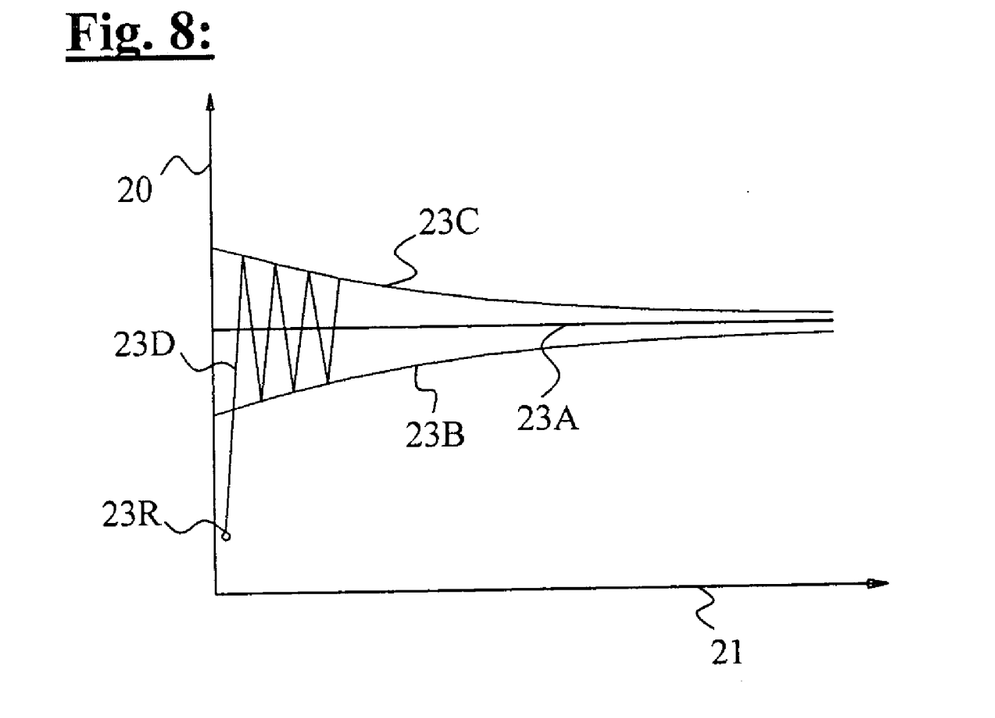
FIG. 8 shows a simplified graph of a control signal change during the slider burnishing process for an exemplary case where the control signal sensor is outside the burnishing area.

In FIG. 8 the curve 23A corresponds to the curve 22A, except for the case where the contacting sensors do not become overlapped by the burnishing areas 1A, 11–13A. Hence, the contacting sensors, e.g. the data read heads 1R, 11–13R, are not exposed to the material removal process. Consequently, the data read heads 1R, 11–13R do not change their static resistance, and the curve 23A is horizontal. The curves 22D, 23D (see FIG. 8) provide examples for the dynamic resistance change during the slider burnishing. After recognizing the reference resistance 22R, 23R, 32R, 42R the slider burnishing process is initiated by bringing the sliders 1, 11–13 into contact with the rotating disk surface 2A. Initially, the dynamic resistance change has a relatively volatile nature. The reason for this is topographic inconsistencies in the hard disk surface that impose varying contacting conditions. During the slider burnishing these topographic inconsistencies are removed and the dynamic resistance change becomes smaller and smaller. This is shown in FIGS. 7 and 8 by the upper boundary curves 22C, 23C and the lower boundary curves 22B and 23B.

It is noted that the contacting sensor may be any device known to those skilled in the art to recognize the contacting characteristic. The contacting sensor may or may not utilize a reference signal.

It is further noted that the reference signal may be a predetermined signal derived independently from the hard disk drive subject to the slider burnishing. The reference signal may be statistically, empirically, or theoretically predetermined.

The slider burnishing is performed by a burnishing method in which the burnishing parameters are variously specified such that distinctive slider burnishing steps are created.

Figure 9:
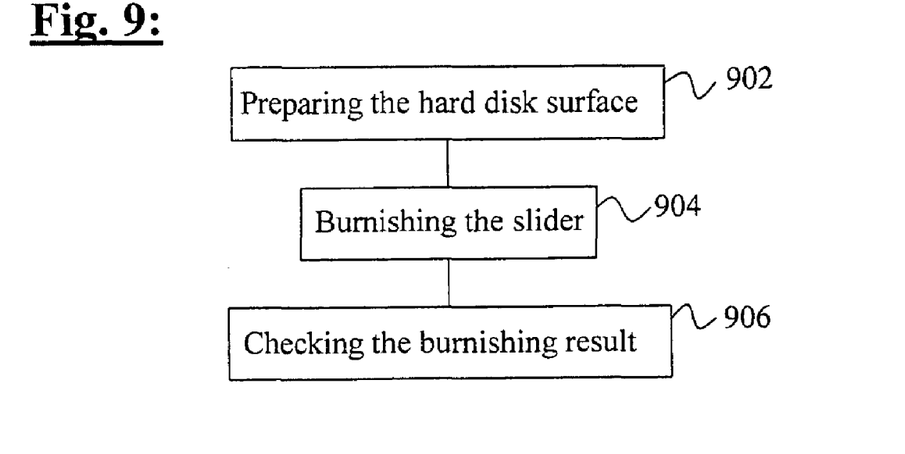
FIG. 9 shows a block diagram of a preferred embodiment of a burnishing method.

FIG. 9 shows a block diagram of the steps of a burnishing method of the preferred embodiment. The burnishing method begins with preparing the hard disk surface, followed by burnishing the slider and finally checking the burnishing result.

During the preparation of the hard disk surface 2A, the sliders 1, 11–13 are continuously lowered, preferably by changing the rotational speed of the hard disk 2 and/or by reducing the environment pressure. The lowering may be performed either in a predetermined fashion, or in correspondence with recognized dynamic resistance fluctuations. Dynamic resistance fluctuations indicate the contacting dynamic. In other words, it is important to prevent the sliders 1, 11–13 from vibrating and from shifting their pitch angles to a negative value when hitting topographic inconsistencies. Topographic inconsistencies may be bumps, waves or the like on the hard disk surface 2A as known to those skilled in the art. The pitch angle corresponds to the adaptation angle 3A. A negative pitch angle would cause the slider to plow into the hard disk surface 2A. This needs to be prevented at any cost.

Once the dynamic resistance fluctuations have reached a minimal level indicating a required planarity and/or smoothness of the hard disk surface 2A, the burnishing parameters are adjusted to levels that create a contacting characteristic primary defined to perform the slider burnishing. The slider burnishing step may be initiated by recognizing the dynamic resistance fluctuations and/or after a predetermined surface preparation period.

Following the slider burnishing step, the hard disk drive is brought into operational mode, which includes, for instance, the adjustment of the environment pressure and/or the adjustment of the hard disk speed to operational levels. The contacting sensor recognizes then the actual fly height achieved by fabricating the predetermined burnishing areas 1A, 11–13A.

Figure 10:
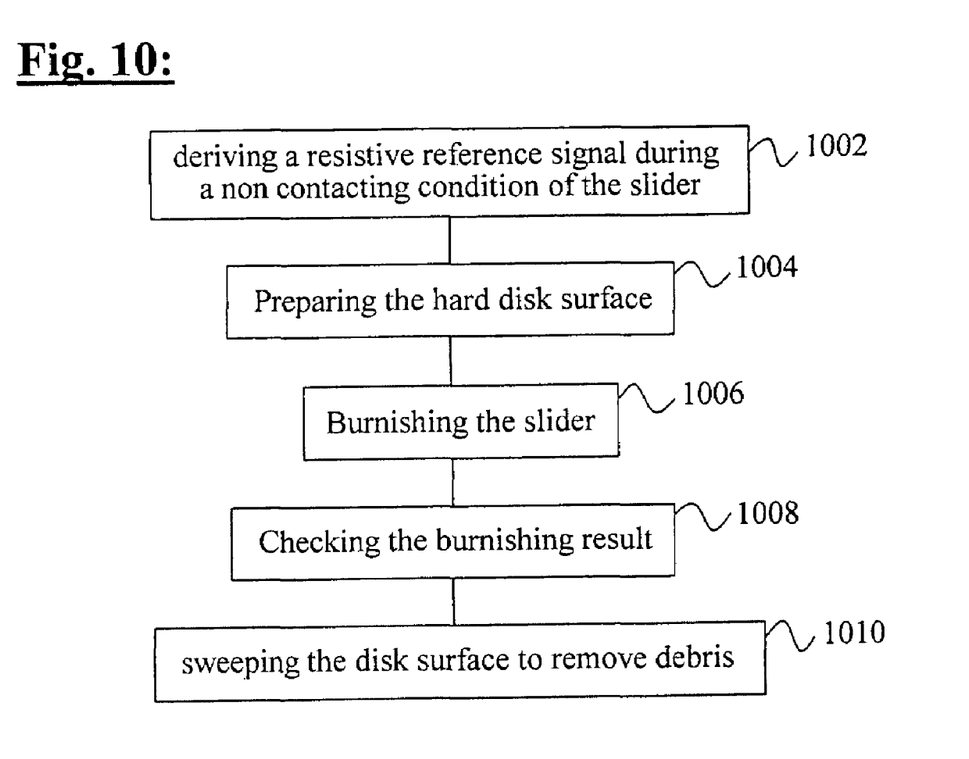
FIG. 10 shows a block diagram of an alternate embodiment of the burnishing method.

FIG. 10 shows a block diagram of the preferred embodiment with the additional steps of deriving a resistive reference signal during a non-contacting condition of the slider and sweeping the disk surface to remove debris. The resistive reference signal may be the natural resistance of a resistive contacting sensor like, in the preferred embodiment, a magnetic read head as is known to those skilled in the art.

The sweeping of the disk surface 2A may be performed with a sequence of centrifugal slider movements in disk contact alternating with centripetal slider movements without disk contact. Disk contacting and non-contacting may be provided, for instance, by changing the rotational speed of the hard disk 2 or the environment pressure.

Figure 11:
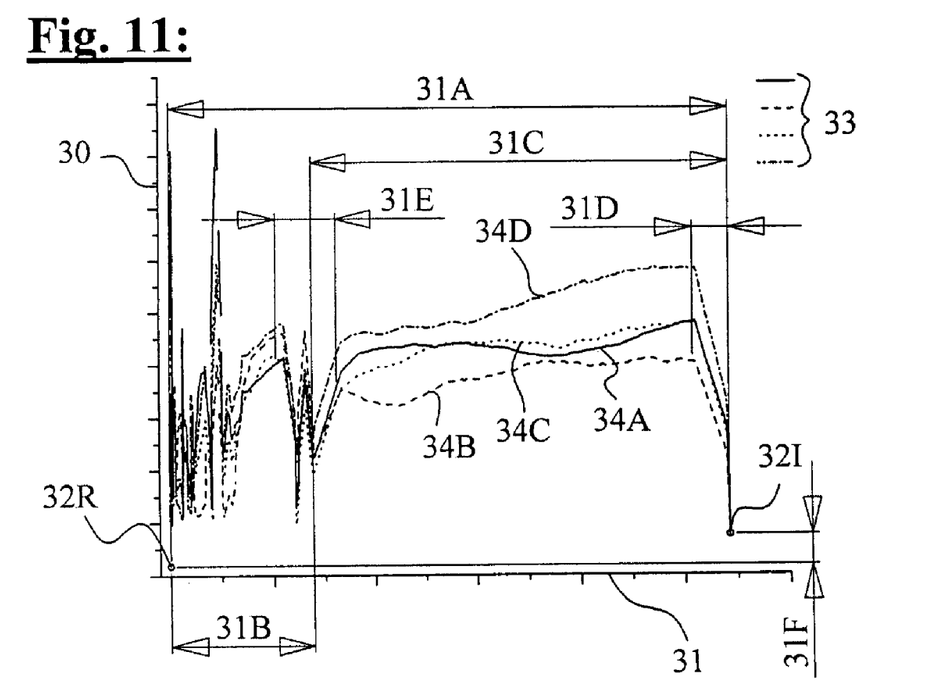
FIG. 11 shows a graph of four exemplary control signal voltages of four different sliders during their burnishing process.

In the case where the resistive reference signal is utilized, the checking of the burnishing result is performed by comparing an operational resistive signal of the contacting sensor derived under operational conditions of the hard disk drive. A non-contacting operation of the sliders 1, 11–13 at a fly height that is accomplished by the defined burnishing areas 1A, 11–13A is established when the operational resistive signal is within a specified range of the resistive reference signal. FIG. 11 shows four curves 34A–D, each having one of the line styles 33. The vertical axis 30 represents a voltage level of the contacting signal in the approximate occurring range during the burnishing method. The four curves 34A–D are derived from experimental slider burnishing performed on sliders that are different from those described in the above. The four curves 34A–D are shown for the sole purpose of general understanding without any claim of accuracy. The four curves 34A–D are integrated from a filtered measured signal and correspond to the simplified curve 22D. The filtered measured signal is cleared of electronic noise and other high and low frequencies, which do not relate to the burnishing process. The burnishing method is applied during the period 31A (see also FIG. 12). The preparation of the slider surface is performed during the period 31B (see also FIG. 12). The slider burnishing is performed during the period 31C (see also FIG. 12).

During the period 31B the voltage level has strong fluctuations as explained above. Towards the end of the period 31B the voltage level change becomes more steady, which indicates the successful preparation of the hard disk surface 2. When the burnishing parameters are changed according to the requirements for the slider burnishing, the voltage level has again strong fluctuations for a short period 31E. This indicates that hit clearance is not obtained yet, which means that the slider is still hitting the disk surface.

During the period 31D at the end of the slider burnishing process, the rotational speed of burnished hard disk is gradually increased again and the regular operational conditions are established. An operational voltage signal 32I is derived. The operational voltage signal 32I has a level discrepancy 31F to a reference voltage signal 32R that indicates a predetermined clearance increase and the successful slider burnishing as described above.

Figure 12:
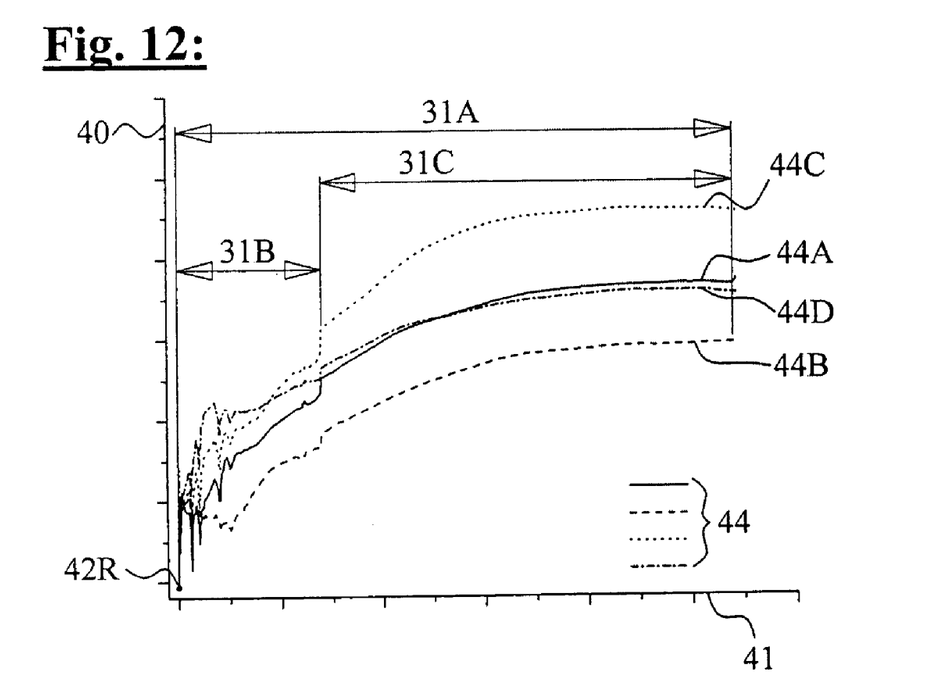
FIG. 12 shows a graph of four relative resistance changes of read heads operating as contacting sensors during the burnishing process of the four sliders referred to in FIG. 11.

FIG. 12 shows four curves 44A–D, each having one of the line styles 44. The vertical axis 40 represents the static resistance change relative to the total resistance in magnetic read heads that are utilized as contacting sensors.

The four curves 44A–D are derived during the same experimental slider burnishing as described in FIG. 11. The four curves 44A–D are shown for the sole purpose of general understanding without any claim of accuracy. The fluctuating static resistance change at the begin of the period 31B results from the disk surface preparation, during which also the slider is exposed to a certain abrasion.

Once the topographic inconsistencies are removed, the relative static resistance change goes into a steady incline. During the change from the disk preparation step to the slider burnishing step the curves 44A–D have a short inconsistency as described in FIG. 11. During the period 31C the tangential angle of the four curves 44A–D goes towards zero, which indicates that the maximum burnishing areas are reached. The curves 44A–D are practically obtained curves that correspond to the simplified curve 22A.

It is noted that the disk surface preparation may be optionally and eventually initiated after performing a disk surface verification process in which the evenness of the hard disk surface is recognized. The verification process may be performed by lowering the sliders 1, 11–13 and recognizing the magnitude of the contacting signal fluctuations to derive information about the topographic inconsistencies. The verification process may be performed only for a relatively short period compared to the surface preparation process, since it does not perform a fabrication but only a measurement.

Accordingly, the scope of the invention described in the specification above is set forth by the following claims and their legal equivalent:

What is claimed is:

1. A burnishing method for burnishing a slider on a hard disk surface, said slider being mounted on a slider arm of a hard disk drive, said burnishing method comprising the steps of:
   A) recognizing eventual topographic inconsistencies on a surface of the hard disk;
   B) preparing the hard disk surface by removing the eventual topographic inconsistencies;
   C) deriving a resistive reference signal during a non-contacting condition of the slider by positioning said slider arm in an operational parking position, the resistive reference signal being a natural resistance of a read head of said slider;
   D) burnishing said slider; and
   E) checking a burnishing result.

2. The burnishing method of claim 1, wherein said checking of said burnishing result is a recognition process of a predetermined fly characteristic of said slider.

3. The burnishing method of claim 2, wherein said fly characteristic is determined by a resistive operational signal derived from said read head and compared to said resistive reference signal.

4. The burnishing method of claim 1, wherein said checking of said burnishing result is a recognizing of a predetermined friction characteristic of a contacting interface between said slider and said hard disk surface.

5. The burnishing method of claim 4, wherein said friction characteristic is determined by a resistive friction signal derived from said read head and compared to a calibration signal.

6. The burnishing method of claim 1, said burnishing method further comprising the step of sweeping said hard disk surface.

7. The burnishing method of claim 6, wherein said sweeping is performed as a final step of said burnishing method.

8. The burnishing method of claim 6, wherein said sweeping is performed by said slider with a centrifugal movement alternating with a centripetal movement.

9. The burnishing method of claim 8, wherein said slider is contacting said hard disk surface during said centrifugal movement and distancing from said hard disk surface during said centripetal movement.

10. The burnishing method of claim 9, wherein said contacting and said distancing are performed by changing an environment pressure.

11. The burnishing method of claim 9, wherein said contacting and said distancing are performed by changing the rotational speed of said hard disk.

12. The burnishing method of claim 1, wherein said preparing of said hard disk surface is provided by a stepped reduction of a disk surface burnishing speed.

13. The burnishing method of claim 1, wherein said preparing of said hard disk surface is provided by a stepped reduction of an environment pressure.

14. The burnishing method of claim 1, wherein said burnishing of said slider is provided by applying a contacting force together with a rotational hard disk speed that corresponds to an abrasion characteristic of said hard disk surface.

15. The burnishing method of claim 1, wherein said burnishing of said slider is provided by applying a contacting force together with a rotational hard disk speed that corresponds to a debris clogging characteristic of a contacting interface between said slider and said hard disk surface.

16. A burnishing method for burnishing a slider on a hard disk surface, the slider being mounted on a slider arm of a hard disk drive, the burnishing method comprising the steps of:
   A) recognizing eventual topographic inconsistencies on a surface of the hard disk;
   B) preparing the hard disk surface by removing eventual topographic inconsistencies;
   C) deriving a resistive reference signal during a non-contacting condition of the slider, wherein the resistive reference signal is a natural resistance of a read head of the slider, and the non-contacting condition is positioning the slider arm in an operational parking position;
   D) burnishing the slider by applying a contacting force together with a rotational hard disk speed that corresponds to one of: (i) an abrasion characteristic of the hard disk surface, and (ii) a debris clogging characteristic of a contacting interface between the slider and the hard disk surface;

E) checking a burnishing result by recognizing one of: (i) a predetermined fly characteristic of the slider, and (ii) a predetermined friction characteristic of a contacting interface between the slider and the hard disk surface; the friction characteristic being determined by a resistive friction signal derived from the read head and compared to a calibration signal, such that the slider contacts the hard disk surface during a centrifugal movement and becomes more distant from the hard disk surface during a centripetal movement; and F) determining the fly characteristic by a resistive operational signal derived from the read head and compared to the resistive reference signal.

* * * * *